UNITED STATES PATENT OFFICE.

THADDAEUS EMILEWICZ, OF BERLIN, GERMANY, ASSIGNOR TO CHEMISCHE FABRIK AUF ACTIEN, (VORM. E. SCHERING,) OF BERLIN, GERMANY.

BENZOYLALKYLAMINOETHANOLS AND PROCESS OF MAKING SAME.

No. 817,164.   Specification of Letters Patent.   Patented April 10, 1906.

Application filed September 18, 1905. Serial No. 278,900. (Specimens.)

*To all whom it may concern:*

Be it known that I, THADDAEUS EMILEWICZ, doctor of philosophy, chemist, a subject of the Emperor of Austria-Hungary, residing at the city of Berlin, Kingdom of Prussia, German Empire, have invented a new and useful Improvement in the Production of Benzoylalkylaminoethanols, of which the following is a specification.

The hitherto unknown benzoylalkylaminoethanols, which possess anesthetic properties, may be obtained by treating the alkylaminoethanols as such or in the form of their salts with benzoylating agents—such as, for example, benzoic-acid anhydrid or benzoylchlorid and the like. The composition of the so-formed benzoylalkylaminoethanols corresponds to the chemical formula:

$$C_6H_5.CO.O.CH_2.CH_2.N\genfrac{}{}{0pt}{}{R_x}{R_y}$$

in which formula $R_x$ is meant for an alkyl group, and $R_y$ for a hydrogen atom which can be replaced by an alkyl group.

The bases expressed by the before-mentioned formula are insoluble in water and decompose upon boiling with alkalies into benzoic acid and the corresponding aminoalcohol. The bases combine with inorganic and organic acids, thus forming the corresponding salts, which possess anesthetic properties. The hydrochloric-acid salts of said bases are easily soluble in water.

Examples.

First. *The manufacture of benzoyl-diethylaminoethanol:*

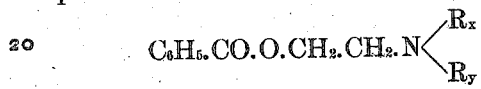

2.5 kilograms of diethylaminoethanol (see *Berichte der Deutschen Chemischen Gesellschaft*, Vol. XIV, pages 1878) are dissolved in one kilogram of water and while heating 7.5 kilograms of benzoic-acid anhydrid are gradually added to the solution. After completion of the reaction the mixture is acidified with dilute hydrochloric acid, the precipitated benzoic acid removed by filtration and by shaking with ether, and the base set free by the addition of soda. The free base is a thick oil which has not up to the present been crystallized. The hydrochloric-acid salt when crystallized out of ethereal alcohol forms fine long needles melting at 124° to 125° centigrade, which are very soluble in water—viz., in the ratio of 1:0.4 at 15° centigrade. It is therefore considerably more easily soluble than the hydrochlorates of the known local anesthetics.

Second. *The manufacture of benzoyl-dimethylaminoethanol.* This compound is produced in the manner described in the first example, but using dimethylaminoethanol. (See *Berichte der Deutschen Chemischen Gesellschaft*, Vol XIV, page 2408, and Vol. XXII, page 114.) The free base is also a thick oil. The hydrochloric-acid salt when crystallized out of a mixture of alcohol and ether forms small white leaves melting at 136° to 137° centigrade. It is easily soluble in water and alcohol, insoluble in ether.

Third. *Benzoyl-monomethylaminoethanol:*

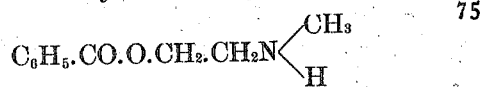

Three kilograms of methylaminoethanol (see *Berichte der Deutschen Chemischen Gesellschaft*, Vol. XXXI, page 1069) are warmed together with two kilograms of water and twelve kilograms of benzoic-acid anhydrid for two hours upon a water-bath. After the addition of dilute hydrochloric acid the product of the reaction is freed from benzoic acid, then rendered alkaline, and shaken with acetic ester. Hydrochloric acid is added to the acetic-ester residue left after distillation until an acid reaction is given, and it is then poured into about five times its bulk of ether. From the emulsion first produced the hydrochloric-acid salt of benzoylmethylaminoethanol separates out after some time in large shiny leaves, melting at 108° to 109° centigrade. The base is a thick oil.

Fourth. *Benzoyl-diisoamylaminoethanol.*—1.02 kilograms of diisoamylaminoethanol (see *annalen der Chemie*, Vol. CCCXVI, page 315) are dissolved in five kilograms of ether and gradually mixed with seven hundred and fifty grams of benzoylchlorid dissolved in three kilograms of ether. After forty-eight hours the precipitated free base is sucked off.

The filtrate consists mainly, besides the free base, of its hydrochlorate. The product is obtained by distilling off the ether, mixing with soda, and absorbing the base with ether. In order to purify it, the oxalic-acid salt is prepared. Benzoyl-diisoamylaminoethanol oxalate is easily soluble in hot water, difficultly soluble in cold, and crystallizes in fine needles, melting at 152° to 153° centigrade. The free base may be crystallized out of acetic ether-ligroin and melts at 87° to 88° centigrade.

The salts of the alkylaminoethanols may also, but less advantageously, be benzoylated. In order to produce benzoyl-diisoamylaminoethanol, I may proceed, for example, as follows: Two kilograms of diisoamylaminoethanol hydrochlorid and 1.4 kilograms of benzoylchlorid are heated on an oil-bath to about 135° centigrade until the smell of benzoylchlorid has disappeared. The product of the reaction is mixed with water, rendered alkaline with soda, absorbed with ether, and transformed, for the purpose of purification, into the oxalate.

I claim as my invention—

1. As new chemical products the benzoyl-alkylaminoethanols, the constitution of which answers the formula

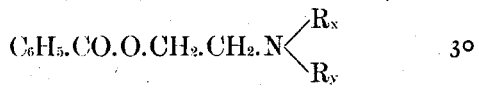

in which $R_x$ is meant for an alkyl group and $R_y$ for a hydrogen atom which can be replaced by an alkyl group; said compounds in the form of the free bases are insoluble in water and decompose upon boiling with alkalies into benzoic acid and the corresponding aminoalcohol, and combine with inorganic and organic acids to form the corresponding salts which have anesthetic properties.

2. The process of producing the herein-described new compounds, which consists in reacting on alkylaminoethanols with benzoylating agents and separating the product of the reaction, substantially as set forth.

In testimony whereof I have hereunto set my hand this 4th day of September, 1905.

THADDÄEUS EMILEWICZ.

Witnesses:
HENRY HASPER,
WOLDEMAR HAUPT.